United States Patent [19]

Lane, Jr.

[11] Patent Number: 4,924,762
[45] Date of Patent: May 15, 1990

[54] SOLAR POWERED AIR FILTER SYSTEM

[75] Inventor: William A. Lane, Jr., Lake Arrowhead, Calif.

[73] Assignee: W. A. Lane, Inc., San Bernardino, Calif.

[21] Appl. No.: 382,490

[22] Filed: Jul. 21, 1989

[51] Int. Cl.⁵ .............................................. E04F 17/02
[52] U.S. Cl. .................................... 98/58; 55/267; 55/512; 98/46; 98/115.1; 98/900
[58] Field of Search ............... 98/42.01, 58, 60, 46, 98/47, 48, 115.1, 900; 55/512, 523, 524, 387, 267

[56] References Cited

U.S. PATENT DOCUMENTS

| | | |
|---|---|---|
| 135,507 | 2/1873 | Barker. |
| 345,107 | 7/1886 | Brinkerhoff. |
| 886,391 | 5/1908 | Moore. |
| 908,614 | 1/1909 | Schuppener. |
| 1,578,030 | 3/1926 | Hirschberg ..................... 98/60 X |
| 2,358,397 | 9/1944 | Howle ............................... 98/46 |
| 3,489,072 | 1/1970 | Secor ................................. 98/58 |
| 3,871,846 | 3/1975 | Berz et al. ..................... 55/512 X |
| 4,085,667 | 4/1978 | Christianson ................. 98/900 X |

FOREIGN PATENT DOCUMENTS

| | | | |
|---|---|---|---|
| 131635 | 10/1980 | Japan ............................. 98/42.01 |
| 1333985 | 8/1987 | U.S.S.R. ............................ 98/900 |

Primary Examiner—Harold Joyce
Attorney, Agent, or Firm—Herb Boswell

[57] ABSTRACT

A solar powered passive air filter system for filtering an air space polluted with particulate matter includes an elongated vertical chimney located in association with the polluted air space and in a position to be exposed to solar radiation. A duct connects the polluted air space to the base of the chimney. A filter medium is located in association with the duct for removing air pollutants from an air stream. An air stream is created in the duct by an ascending air stream in the chimney. The ascending air stream in the chimney is maintained in response to exposure of the chimney to solar radiation.

20 Claims, 1 Drawing Sheet

SOLAR POWERED AIR FILTER SYSTEM

BACKGROUND OF THE INVENTION

This invention is directed to a solar powered passive air filter system utilizing a tall solar powered chimney to generate an air draft for drawing polluted air through a filter medium from a space polluted with particulate matter as for instance from either an open space or from the interior of a structure.

Particulate matter air pollution can be found in garbage dumps, in mining operations, sand and gravel processing and other large scale industrial processing. Currently about the only way to limit or combat such particulate matter air pollution is by "watering down" or water spraying the work area associated with the dump, the mine, the sand and gravel operation area etc.

At best such water spraying is only marginally effective. In those area which can be sprayed the water is subjected to evaporation and drainage and must be continuous re-applied. In many areas water is a very precious resource and can not be wasted. In such a "dry" area water for use in water spraying for particulate matter control is not available and thus this pollution control method simply can not be practiced.

Additionally, a variety of manufacturing processes created undesirable air pollutants within the interior of the factories and manufacturing plants wherein these processes are conducted. Such manufacturing processes contaminate the interior of their factory spaces with air particles such as fine sawdust, fiber glass fines, paint aerosols, sulfur and other chemical dusts, fertilizer dust and other dusts and particulate matter. These are both damaging to the external environment when discharged to the external environment and, hazardous to the employees working within the contaminated air space. Further these fine particles are destructive to machinery operating within the working air space.

Heretofore in order to filter the air in these contaminated manufacturing and/or factory environments, energy consuming filter systems have been utilized. Such filtering systems utilize cyclones or fans to move air through filter medium for removing of the particulate matter from the air. While these systems are certainly efficient and utilitarian they are energy intensive. Further, while they remove one air pollutant, i.e. the particulate matter, they generate other forms of pollution, either directly or indirectly, via the discharge of heat and exhaust gasses utilized to create the energy sources for driving their mechanical air movers.

Passive hot air chimneys are utilized for exhausting waste combustion gasses from heaters, furnaces, kilns, boilers and the like. The hot gasses discharged from such heaters, furnaces, kilns and boilers expand and rise within a chimney creating a draft for not only removing the waste gasses, but also for driving oxygen into the combustion chambers of these devices.

Almost a century ago it was first recognized that a "flue draft" could be utilized in association with a ventilator or a heater for removing cold air adjacent to a floor of a structure which was being heated with the ventilator or heater. Examples of this can be found in U.S. Pat. Nos. 135,507, 345,107, 886,391 and 908,614.

While almost a century has elapsed since it was recognized that cold air could be removed from the floor of a structure utilizing a ventilator draft, it has heretofore escaped the attention of engineers and air pollution specialists to utilize a hot air draft for powering a filtering system.

Many industrial plants years ago were equipped with what can be termed as "tall stacks." These were utilized to discharge combustion gasses from coal or wood fed burners high in the atmosphere. With the availability of other fuels, such as natural gas and oil, and with increased awareness of the consequences of combustion discharge from these tall stacks, use of these tall stacks has fallen into disfavor and many stand abandoned or have been destroyed.

In many industrial settings a tall stack has been dismantled concurrently with the installation of energy intensive air pollution control systems because of the failure of those in charge of providing for air pollution control to recognize the potential utility of utilizing idle tall stacks as an energy source for pollution control.

BRIEF DESCRIPTION OF THE INVENTION

In view of the above it is a broad object of this invention to provide for a solar powered passive air filter system which utilizes a vertical chimney exposed to solar radiation as the sole source of power for providing for air filtration of particulate matter. It is a further object of this invention to provide for apparatus and processes for conducting air filtration in the absence of any external energy source other than that provided by an air draft in a solar heated stack or chimney.

These and other objects as will become evident from the remainder of this specification are achieved in a solar powered passive air filter system containing no mechanical air movers comprising a particulate matter polluted air space and an elongated vertical chimney located in association with the polluted space in a position to be exposed to solar radiation. The chimney is constructed having an outside surface, an inside surface, a base, an open top and a hollow interior extending between the base and the open top. In response to exposure to solar radiation the chimney is capable of passively maintaining an ascending air stream through its interior from its base to its open top and exhausting this ascending air stream from the open top. A duct for forming an air passage connects the polluted space to the interior of the chimney near the base of the chimney. The duct is utilized to conduct an air stream from the polluted space to the base of the chimney. A filter for removing particulate matter air pollutants is located in association with the duct in a position to intersect the air stream moving through the duct between the polluted space and the base of the chimney for removing particulate matter from air from the polluted space prior to incorporation of that air in the ascending air stream of the chimney.

The chimney by virtue of being a three dimensional structure will include at least a south and north facing surface portion on its outside surface. Operation of the chimney can be augmented by insulating the north facing surface portion of the outside surface of the chimney to prevent or to inhibit the loss of heat via radiation, convention or conduction from the north face of the chimney. The chimney can be further augmented by including a thermoconductive material located between the inside surface of the chimney and the south facing surface portion of the outside surface of the chimney for increasing absorption of thermal radiation by the chimney. The chimney can further be augmented by coloring the south facing surface portion of the chimney a dark color, preferably black and by coloring the north facing surface portion of the outside surface of the chimney a light color, preferably white.

The operation of the chimney can also be augmented by locating reflectors in association with the chimney for reflecting solar radiation onto the chimney to assist in heating of the chimney. Further, the south facing surface portion of the outside surface of the chimney can be augmented by shaping the south facing surface in a concave shape to assist in absorption of solar radiation.

Particularly compatible with the use of solar energy to power the instant passive air filter system is the utilization of "waste" products for the filter medium. As such the filter means of the invention can include a mass of finely divided solids and a grate means for supporting the same. The finely divided solids when piled on the grate means present a plurality of air spaces between individual particles of these solids for trapping particulate matter from air filtered through such a filter means.

Use of finely divided solids for the filter means can be augmented by locating liquid agents on their surface. The liquid agents on the surface of the solid particles would facilitate the absorption of solid particulate matter and can also serve for the absorption of gaseous air pollutants onto the filter.

BRIEF DESCRIPTION OF THE DRAWINGS

This invention will be better understood when taken in conjunction with the drawings wherein.

This invention utilizes certain principles and/or concepts which are set forth in the claims appended hereto. Those skilled in the arts to which this invention pertains will realize that these principles and/or concepts are capable of being utilized in a variety of embodiments which may differ from the exact embodiment utilized for illustrative purposes herein. For this reason this invention is not to be construed as being limited solely to the illustrative embodiments, but is only to be construed in view of the claims.

DETAILED DESCRIPTION OF THE INVENTION

Pollution of the air with particulate matter is a direct consequence of the operation of many industries, manufacturing and mining process and/or civic projects. Such particulate matter air pollution is generate in both unconfined (out door) areas as well as in confined (in door) areas. Mines, coal processing, and sand and gravel processing all generate fines, dusts or other particulate matter. Further garbage dumps, sludge processing and other civic projects can also generate large quantities of particulate matter air pollution. In confined areas, particulate matter air pollution is also an unwanted by product of many manufacturing processes conducted within factories, plants and other structures.

For the purposes of illustration of this invention, the invention will be described in association with particulate matter air pollution control within the confined space of a structure. It is to be understood however that the invention is not limited to controlling air pollution in only confined spaces. The invention is equally suitable for practice in any environment where particulate matter air pollution is generated including but not limited to large open unconfined areas. Indeed with respect to open unconfined areas, except for surface spraying (wetting down), particulate matter air pollution control in unconfined areas previously has not been practiced.

Figure 1:
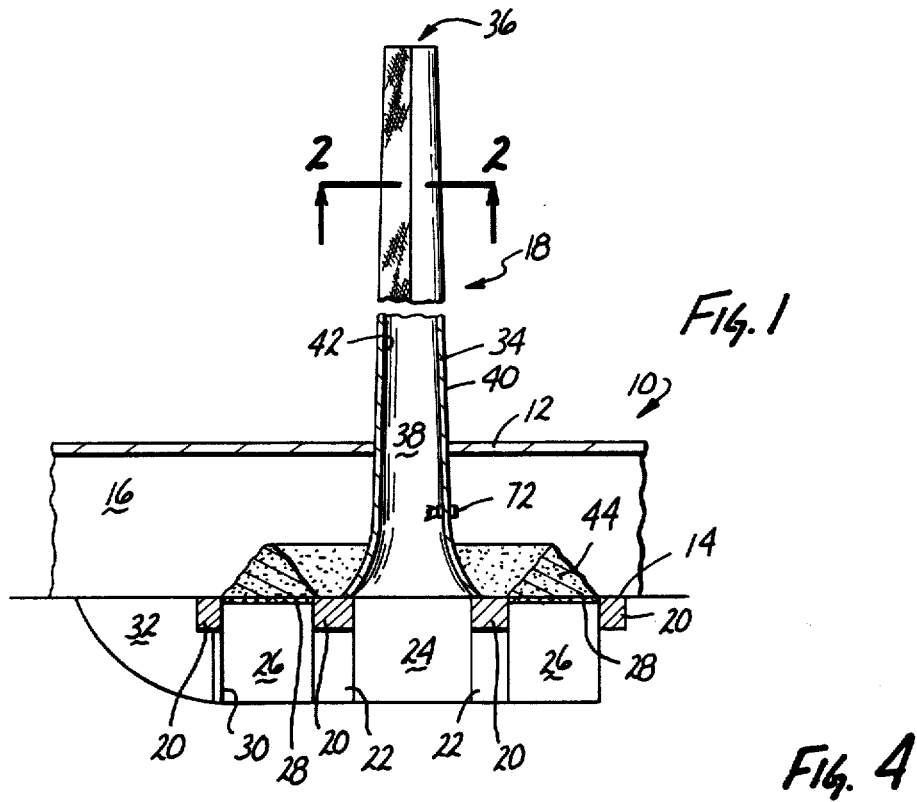
FIG. 1 is a side elevational view in partial section of a portion of the interior of a structure, a tall chimney or stack located in association with said structure and filter beds located adjacent the stack or chimney.

For illustration of the invention, depicted in FIG. 1 is a structure 10 characterized by its roof 12 and its floor 14. Existing between the roof 12 and the floor 14 is an interior space 16.

For the purposes of this specification it will be assumed that an industrial process is conducted within the structure 10 which generates and discharges air pollutants into the interior space 16. Typical of such an industrial process might be the construction of furniture wherein excessive amounts of fine sawdust are discharged into the interior space 16, a boat fabrication shops where excessive amounts of fiber glass fines are discharged into the interior space 16, a paint shop where paint aerosols are discharged into the interior space 16 and/or an industry such as a foundry wherein, because of the typical use of sand and the like as a flooring material excessive dust is continually generated.

Located adjacent to the structure 10, and as seen in FIG. 1, actually located such that it extends through the roof of the structure 10 is an elongated vertical chimney or tall stack 18. In many industries existing chimneys or stacks stand unused because of the conversion of fuel sources and/or because environmental problems such as generation of acid rain. For the purposes of this specification, and for use in this invention the chimney 18 is located in association with the structure 10. For an unconfined environment, a chimney, such as the chimney 18, normally would be centrally located in the center of the area wherein the particulate matter air pollution occurred.

The chimney 18 is supported via foundation 20. Gaps or air passages 22 lead from the base of the chimney 24 to an annular area 26 which is located directly underneath an annular grate 28. The annular area 26 and the air passages 22 serve as a duct between the interior 16 of the structure 10 and the base 24 of the chimney 18.

A clean out or access door 30 opening through a depressed area 32 in the floor 16 of the structure 10 provides access to the area beneath the grate 28 and into the base 24 of the chimney.

The wall 34 of the chimney 18 extends from the base 24 to an open top 36. The wall 34 surrounds the hollow interior 38 of the chimney 18 which extends from the base 24 to the top 36. The wall 34 has an outside surface 40 and an interior surface 42.

A filter medium 44 is stacked on the grate 28. The filter medium 44, as is hereinafter described in greater detail, is selected to be a material which has a plurality of small convoluted passageways. The convoluted passageways serve to trap particulate matter in an air stream being drawn through the filter medium 44.

The chimney 18 extends outside of the structure 10 in a location exposed to solar radiation. Impingement of solar radiation on the chimney 18 heats up the air within the interior 38 of the chimney, decreasing its density and causing it to rise upwardly toward the open top 36. Since an air passage has been created through the filter medium 44, the grate 28, the annular area 26 and the air passages 22 between the interior space 16 of the structure 10 and the base of the chimney 24, as the air heats up within the interior of the chimney 18 it moves up as an ascending air stream, exhausting out of the top 36 and replenishing itself via air drawn into the base 24 through the ducts, passages and filter medium from the interior space 16 of the structure 10.

The above basic solar powered operation of the passive filter system of the invention can be augmented to increase the solar efficiency within the chimney 18 and thus to increase the air flow through the filter medium 44 via several expedients. The first such expedient would include coloring the south facing portion 46 of the outside surface of the chimney 18 a dark color, preferably black. By doing so, a greater percentage of the radiation striking the surface 46 of the chimney 18 will be absorbed by the chimney 18 for heating of the air stream within the interior 38 of the chimney 18.

A further expedient includes coloring the north facing portion 48 of the outside surface of the chimney 18 a light color, preferably white to inhibit radiation of energy from the chimney 18 for better utilization of heat absorbed by the chimney 18 in heating its ascending air stream.

Figure 2:
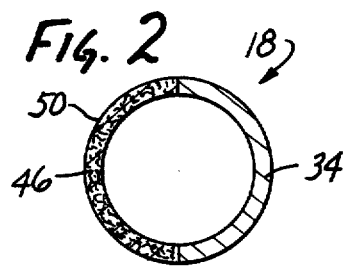
FIG. 2 is a sectional view about the line 2—2 of FIG. 1.
Figure 3:
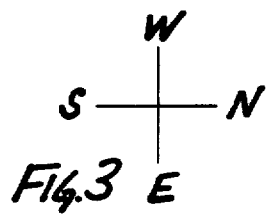
FIG. 3 is a schematic representation of a compass heading utilized for orientation of the structures of FIGS. 2, 4, 5 and 6.
Figure 5:
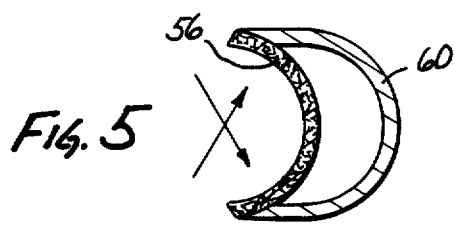
FIG. 5 is a sectional view through a further chimney of the invention similar to the chimney of FIG. 2.

Additional expedients for increasing the thermal efficiency of the chimney 18 include incorporation of thermal conducting material in the south facing portion of the chimney. FIG. 3 shows a compass orientation which is used with FIGS. 2, 4, 5 and 6 showing orientation of the chimneys of these figures with respect to the compass headings. In FIG. 2, the wall 34 of the chimney 18 has been constructed such that its south facing portion 46 of the outside surface is formed of a thermal conductive material 50. To facilitate transfer of solar radiation received on the outside surface to the interior of the chimney 18, the material 50 is chosen such that it is an efficient conductor of solar radiation incipient thereon. Suitable for the material 50 would be a material such as silicon nitrite. Bricks or blocks of silicon nitrite have sufficient structural integrity to serve as a construction material for the chimney 18 and additionally have other desirable properties including a thermal conductivity on the order of the thermal conductivity of cast iron. Further, such material is naturally dark in color and thus simultaneously serves as a dark surface for more efficient receipt of thermal radiation.

The north side of the chimney 18 as seen in FIG. 2 can be constructed of a thermal insulative material 52, as for instance an insulative fire brick or the like. This would impede loss of heat from the chimney 18 on its north side which is not exposed solar radiation.

For the use in converting existing tall stacks such that they serve as the solar powered chimney of the invention, an insulative blanket on either the inside or outside surface of the north side of such chimney would serve to impede loss of thermal energy from such a chimney. Further, existing tall stacks are normally made of brick work which, while slow to heat up, retain a considerable amount of thermal energy and thus would serve to maintain an ascending air stream for some hours after sunset.

Figure 4:
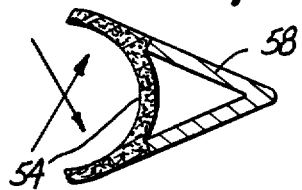
FIG. 4 is a sectional view through a chimney of the invention similar to the sectional view of FIG. 2.

In constructing chimneys to serve as the power source of the invention, further design considerations can be included. Shown in FIG. 4 in cross section is an asymmetrical chimney. In the chimney of FIG. 4 the south facing wall 54 is concave in shape and in conjunction with this shape, the chimney is also formed of a thermal conductive material. This serves to present a large thermal absorbing face to incipient solar radiation.

In the cross section of the chimney seen in FIG. 5, again the south facing wall 56 is concave in shape. The embodiments of FIGS. 4 and 5 differ with respect to the shape of the remainder of the chimney. In FIG. 4 a angular wall 58 is utilized in conjunction with the concave wall 54 and in FIG. 5, a convex wall 60 is utilized in conjunction with the concave wall 56.

Figure 6:
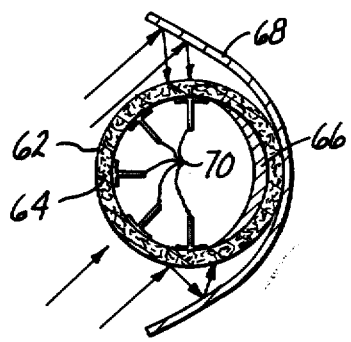
FIG. 6 is a sectional view through an additional chimney of the invention similar to the chimney of FIG. 2 in conjunction with the use of a reflector also shown in section.

In the embodiment of FIG. 6 a circular wall 62 is utilized. This circular wall 62 incorporates a thermal conducting material 64 in its south face, and an internal insulative material 66 on the inside of its north wall. The material 66 can be any one of a suitable insulative material, as for instance ceramic fiber material, insulative plaster or the like. Located in association with the circular wall 62 of the chimney of FIG. 6 is a reflector 68.

The reflector 68 bends around the north face of the wall 64 and is spaced away from the east and west walls. As so constructed, radiation not directly incidence upon the wall 64 is reflected by the reflector 68 onto the wall 64 for increased heating of the interior of the chimney.

Also shown in FIG. 6 is the incorporation of metal plates 70 within the interior of the wall 64. The metal plates 70 make contact with the thermal conductive material 64 and extend into the air space within the interior of the wall 62 for increased efficiency in heat transfer to the ascending air stream.

The use of thermal conductive material, insulative material, light and dark color coatings, reflectors, convex shapes, interior metal plates and the like all serve as means for augmenting the heating of an ascending air stream within the interior of a chimney of the invention. Each of these means works in conjunction with the solar radiation incident upon a chimney of the invention.

To facilitate the initiation of an ascending air draft within the chimney 18, a burner 72 can be located therein adjacent to the base 24. When the sun rays initially strike the chimney 18 in the early morning, while the interior of the chimney 18 slowly heats up, an initial firing of the burner 72 will cause a rapid ascending air stream to be generated for initiating circulation of the air stream within the chimney 18. Use of the burner 72, however, is only contemplating for initially starting air circulation within the chimney 18. Once an ascending air stream has been created within the chimney 18 the use of the burner 72 is discontinued and only solar radiation is used for powering of the air filtering system of the invention.

A typical height for the chimney 18 of the invention would be greater than about 100 feet, preferably greater than 500 feet. As with existing combustion discharge chimneys, chimney heights up to several thousand feet could be utilized.

While it is recognized that filter medium specifically manufactured for filtering purposes might be utilized for the filter of the invention it is specifically contemplated that materials normally considered to be waste materials can serve equally well as a filtering medium. Use of such waste materials provide a further economic advantage. Typically a waste material of a particular industrial process can itself serve as a filtering medium.

Waste materials such as sawdust, cotton wastes, flue glasses, glass microspheres are thus contemplated for filtering material of the invention. Further, irregular shaped or discolored or otherwise tainted foams as, for instance urethane and styrene foams which are unsuitable for sale by a manufacturing facility could be utilized as the filtering medium for use at that manufacturing facility. While a material such as milk solids can be an economically viable material when they are utilized near their production source, in other instances when they must be transported, the transportation costs can be greater than the economic value of the product. As such, such products could be used as a filtering medium in an industrial settings near their source of production.

Further materials such as solid residues from petroleum refineries, ground nut shells, ground fruit pits, corncobs and plant fibers could also serve as a solid filter medium. In a like manner in certain industries only particular particle sizes of a commodity are presently commercially utilized and other particle sizes are considered waste. Thus, fine particles of expanded and unexpanded perlite and vermiculite serve as excellent candidates for a filter medium of the passive filter system of the invention.

In a like manner coarse clays as for instance montmorillonite, bentonite, feldspar, whitening, kaolin, ball clay and sericitic clay can serve as the filtering medium. Additionally, silicas, aluminum oxides, coarse gypsums, diatomaceous earths, kieselguhr, infusorial earths, zeolites, micas, chalks, excelsiors, and other common filter medium can be utilized. Also papers, pulpace, metal turnings, and even ground automobile tires, are suitable.

It is evident that a variety of filter mediums can be utilized in the solar air passive air filter system of the invention including but not limited to finely divided solids comprising solids selected from the group consisting of sawdust, sand, unexpanded and expanded perlite, unexpanded and expanded vermiculite, clays, silicas, flue glasses, glass microspheres, glass wools, aluminum oxides, gypsum, diatomaceous earths, kieselguhr, infusorial earths, zeolites, micas, chalks, papers, pulps, cotton wastes, rags, metal turnings, excelsiors, ground nut shells, ground fruit pits, organic foams including urethane and styrene foams, ground tires, petroleum tars solids, milk solids, and plant fibers. In fact, even dry garbage can be considered as a suitable material for a filter medium.

It is considered that other filter medium will become evident to the art skilled given the suggested filter mediums herein. What is required of the filter medium of the invention is that it be capable of being located within an air stream and packed, layered or stacked in such a manner that a multiplicity of small air channels are created between the individual filter particles such that an air stream passing through the filter medium must make many undulations and convolutions to pass through the medium. This serves to remove particulate matter from an air steam and trap it in the filter medium.

A liquid can be located on the filter medium to assist in its filtering action. This can be as simple as wetting saw dust or excelsior with water such that the trapping of air pollutants is facilitated. Other liquids, as for instance light oils or the like, might be also loaded on the surface of a finely divided solid filter medium. This would assist in the absorption of organic vapors and organic dispersions, as for instance, paints, varnishes and resins expelled during spraying operations. Thus, a light oil which in itself is not volatile, could be used on the surface of a further material as, for instance perlite fines to absorb organic pollutants or oil bearing lath or mill turnings could be used as a filter medium for other industrial process (e.g. painting) which are conducted "downstream" from the machining operation which generated the turnings.

As described in FIG. 1, the filter medium 44 is stacked onto the grate 28 as an annular pile. The grate 28 would be chosen such that the size of its openings is slightly less than the size of the smallest particle of filter medium used. Thus, for instance, if a filter medium having a size range of 200 mesh or greater is utilized the grate would be chosen such that it retained this filter medium. Further the filter medium 44 could be built up by stacking various sizes or kinds of filter materials one on the other. Thus, a coarse material could be located on the grate 28 (or could serve itself as a grate) and this coarse material in turn serve to support a finer material.

I claim:

1. A solar powered passive air filter system containing no mechanical air movers for filtering particulate matter from a particulate matter polluted air space comprising:
   an elongated vertical chimney located in association with said polluted air space in a position exposed to solar radiation, said chimney having an outside surface, an inside surface, a base, an open top and a hollow interior connecting between said base and said open top, said chimney having passive means in response to exposure to solar radiation capable of passively maintaining an ascending air stream through its interior from its base to its open top and exhausting said air stream from said open top, said outside surface of said chimney having at least a south and north facing surface portions;
   duct means for forming an air passageway from said polluted air space to said base of said chimney to conduct an air stream from said space to said base of said chimney; and
   filter means for removing particulate matter air pollutants from said air stream, said filter means located in association with said duct means to remove particulate matter from air conducted through said duct means.

2. A passive air filter system of claim 1 wherein:
   said chimney includes an insulator material located between its said inside surface and said north facing surface portion of its said outside surface.

3. A passive air filter system of claim 1 wherein:
   said chimney includes a thermoconductive material located between its said inside surface and said south facing surface portion of its said outside surface.

4. A passive air filter system of claim 1 wherein:
   said south facing surface portion of said outside surface of said chimney is dark in color.

5. A passive air filter system of claim 4 wherein:
   said north facing surface portion of said outside surface of said chimney is light in color.

6. A passive air filter system of claim 1 wherein:
   said south facing surface portion of said outside surface of said chimney is concave in shape.

7. A passive air filter system of claim 1 further including:
   reflector means for reflecting solar radiation, said reflector means located in association with said chimney to reflect solar radiation onto a least a portion of said outside surface of said chimney.

8. A passive air filter system of claim 1 wherein:
said passive means for augmenting heating said ascending air stream in said interior of said chimney includes at least one of: (a) a thermoconductive material located adjacent said inside surface of said south facing surface portion of said outside surface of said chimney, (b) an insulator material located adjacent said inside surface of said north facing surface portion of said outside surface of said chimney, (c) said south facing surface portion of said outside surface of said chimney being dark in color, and (d) said north facing surface portion of said outside surface of said chimney being light in color, (e) said south facing surface portion of said outside surface of said chimney being concave in shape and (f) reflector means for reflecting solar radiation, said reflector means located in association with said chimney to reflect solar radiation onto a least a portion of said outside surface of said chimney.

9. A passive air filter system of claim 1 wherein:
said filter means includes grate means for supporting fine solids;
said filter means further includes a mass of finely divided solids, said mass of finely divided solids having a plurality of air passageways between individual particles of said finely divided solids; and
said mass of finely divided solids located on said grate means.

10. A passive air filter system of claim 9 wherein:
said finely divided solids comprises solids selected from the group consisting of sawdust, sand, unexpanded and expanded perlite, unexpanded and expanded vermiculite, clays, silicas, flue glasses, glass microspheres, glass wools, aluminum oxides, gypsum, diatomaceous earths, kieselguhr, infusorial earths, zeolites, micas, chalks, papers, pulps, cotton wastes, rags, metal turnings, excelsiors, ground nut shells, ground fruit pits, organic foams including urethane and styrene foams, ground tires, petroleum tars solids, milk solids, plant fibers and dry garbage.

11. A passive air filter system of claim 9 further including:
liquid agents capable of absorption, said liquid agents located on said finely divided solids.

12. A passive air filter system of claim 1 further including:
means for initiating an ascending air draft in said interior of said chimney, said later means located in said chimney.

13. A passive air filter system of claim 12 wherein:
said means for initiating an ascending air draft comprises a burner means for generating hot gasses, said burner means located in said interior of said chimney proximal to said base of said chimney.

14. A passive air filter system of claim 1 wherein:
said chimney is greater than 100 feet tall.

15. A passive air filter system of claim 15 wherein:
said chimney is greater than 500 feet tall.

16. A solar powered passive air filter system containing no mechanical air movers for filtering particulate matter from a particulate matter polluted air space consisting of:
an elongated vertical chimney greater than 100 feet in height located in association with said polluted air space in a position exposed to solar radiation, said chimney having an outside surface, an inside surface, a base, an open top and a hollow interior connecting between said base and said open top, said outside surface of said chimney having at least a south facing surface portion;
passive heat means associated with said chimney for heating said interior of said chimney by solar radiation to passively create an ascending air stream through said interior of said chimney from its base to its open top and exhaust said air stream from said open top;
duct means for forming an air passageway from said polluted air space to said base of said chimney to conduct an air stream from said polluted air space to said base of said chimney;
grate means for supporting fine solids, said grate means located in association with said duct means whereby said air stream from said polluted air space to said base of said chimney passes through said grate means;
a mass of finely divided solids, said mass of finely divided solids having a plurality of air passageways between individual particles of said finely divided solids; and
said mass of finely divided solids located on said grate means to filter and trap particulate matter from air passed through said grate means.

17. A passive air filter system of claim 16 wherein:
said means for passively heating said interior of said chimney to create said ascending air stream in said interior of said chimney includes at least one of: (a) a thermoconductive material located adjacent said inside surface of said south facing surface portion of said outside surface of said chimney, (b) said south facing surface portion of said outside surface of said chimney being dark in color, (c) said south facing surface portion of said outside surface of said chimney being concave in shape, and (d) a reflector means for reflecting solar radiation, said reflector means located in association with said chimney to reflect solar radiation onto a least a portion of said outside surface of said chimney.

18. A solar powered process for filtering particulate matter from a particulate matter polluted air space comprising:
locating an elongated vertical chimney in association with said polluted air space in a position to be exposed to solar radiation, said chimney including an outside surface, an inside surface, a base, an open top and a hollow interior connecting between said base and said open top, said outside surface of said chimney having east, south, west and north facing surface portions;
locating an air passageway between said polluted air space and the interior of said chimney near said chimney base;
selecting an air filter capable of removing particulate matter from an air stream;
locating said air filter in association with said air passageway such that an air stream flowing in said air passageway flows through said air filter;
initiating an ascending air stream through the interior of said chimney from its base to its open top;
utilizing solar radiation to passively maintain said ascending air stream through said interior of said chimney and exhausting said air stream from said open top of said chimney;

feeding air through said air filter and said air passageway from said polluted air space to said ascending air steam in said chimney to conduct an air stream from said polluted air space through said air filter to remove particulate matter in said air stream and discharge said air steam having particulate matter removed therefrom into said ascending air stream in said chimney.

19. The process of claim 18 further including:

coloring said south facing surface portion of said outside surface of said chimney a dark color to augment absorption of solar radiation by said south facing surface portion of said outside surface of said chimney.

20. The process of claim 18 including:

selecting as said air filter finely divided solids located on a supporting grate.

* * * * *

UNITED STATES PATENT AND TRADEMARK OFFICE
CERTIFICATE OF CORRECTION

PATENT NO.  : 4,924,762
DATED       : MAY 15, 1990
INVENTOR(S) : WILLIAM A. LANE, JR.

It is certified that error appears in the above-identified patent and that said Letters Patent is hereby corrected as shown below:

Column 1, line 19, "area" should be --areas--.

Column 1, line 21, "continuous" should be --continuously--.

Column 2, line 60, "convention" should be --convection--.

Column 3, line 63, "generate" should be --generated--.

Column 4, line 28, "shops" should be --shop--.

Column 5, line 58, "exposed" should be --exposed to--.

Column 6, line 26, "incidence" should be --incident--.

Column 6, line 52, "contemplating" should be --contemplated--.

Column 8, line 4, "lath" should be --lathe--.

Column 8, line 6, "process" should be --processes--.

Column 9, line 1, "a" should be --at--.

Column 9, line 4, delete "augmenting".

Column 9, line 20, "a" should be --at--.

Column 9, line 60, "of claim 15" should be --of claim 14--.

Signed and Sealed this

Twenty-first Day of July, 1992

Attest:

DOUGLAS B. COMER

Attesting Officer

Acting Commissioner of Patents and Trademarks